United States Patent [19]
Rich

[11] 3,915,128
[45] Oct. 28, 1975

[54] MULTI-BORE INTAKE MANIFOLD WITH IMPROVED FUEL DISTRIBUTION

[75] Inventor: Robert E. Rich, Okemos, Mich.

[73] Assignee: General Motors Corporation, Detroit, Mich.

[22] Filed: Sept. 16, 1974

[21] Appl. No.: 506,036

[52] U.S. Cl... 123/52 MV; 123/122 A; 123/122 AC
[51] Int. Cl.² ........................ F02M 35/00
[58] Field of Search...... 123/52 MV, 119 A, 122 A, 123/122 AC, 122 AB

[56] References Cited
UNITED STATES PATENTS

| | | | |
|---|---|---|---|
| 2,730,091 | 1/1956 | Burrell | 123/52 MV X |
| 3,678,905 | 7/1972 | Diehl | 123/52 MV X |
| 3,717,130 | 2/1973 | Thornburgh | 123/122 AB |
| 3,780,715 | 12/1973 | Flitz | 123/52 MV X |
| 3,809,019 | 5/1974 | Stoltman | 123/122 AB X |
| 3,868,868 | 3/1975 | Chana | 123/119 A X |

Primary Examiner—Charles J. Myhre
Assistant Examiner—William C. Anderson
Attorney, Agent, or Firm—Robert M. Sigler

[57] ABSTRACT

An intake manifold for a V-type internal combustion engine with a four-barrel carburetor is of the single level type with a manifold chamber and a plurality of feed conduits connecting the manifold chamber with the engine intake ports. The primary bores of the manifold are open to the secondary bores but cut off at the bottom from direct communication with the manifold chamber by primary floors. This forces all fuel from the primary, as well as secondary bore, to enter the manifold chamber through the secondary bores for consistent fuel distribution among the cylinders under all engine operating conditions. The primary floors allow inclusion of an exhaust heating conduit therethrough to vaporize liquid fuel deposited on the primary floors. In addition, an exhaust gas recirculation conduit is open to the primary bores; and the exhaust gases entering therefrom are assisted in mixing with the fuel mixture by the extra length and turbulence of their path to the manifold chamber.

4 Claims, 3 Drawing Figures

MULTI-BORE INTAKE MANIFOLD WITH IMPROVED FUEL DISTRIBUTION

SUMMARY OF THE INVENTION

My invention relates to intake manifolds for multicylinder internal combustion engines and multi-bore, multi-stage carburetors. A particular problem with such intake manifolds is that of varying fuel distribution to the cylinders.

Multicylinder internal combustion engines run with the greatest power and fuel economy and lowest undesirable emissions when fuel, oxygen and inert gases are thoroughly mixed in the correct proportions and evenly distributed to the cylinders. A particular problem with multi-bore, multi-stage carburetors is the maintenance of a consistent delivery of fuel to the cylinders when the fuel enters the manifold in varying amounts through each of the bores. Four-barrel carburetors for V-type multicylinder engines generally have primary and secondary bores on each side of a line running front to back through the middle of the engine and manifold. This ensures even side to side distribution; however, the front to back arrangement of primary and secondary bores produces changing distribution between front and back cylinders as the carburetor secondary bores cut in and out.

My invention comprises opening each of the primary bores to one of the secondary bores and blocking off the bottom of the primary bores with a primary floor so that fuel mixture from the primary bores must enter the manifold chamber through the secondary bores. Thus, fuel always enters the manifold chamber at the same point.

The addition of the primary floors, in addition, effect an improvement in the mixing of exhaust gases from an exhaust gas recirculation conduit which normally opens to the primary bores. Not only do the exhaust gases from this conduit now have a longer path in which to mix with fuel mixture before entering the manifold chamber, but the mixing is enhanced by turbulence as the mixture moves into the secondary bore.

A further effect of my invention is the creation, in the primary floors, of a location for an exhaust gas heater conduit to provide a preliminary heating area in the primary bores for the vaporization of liquid fuel.

These and other advantages of my invention will be apparent from the accompanying drawings and following description of the preferred embodiment.

DESCRIPTION OF THE PREFERRED EMBODIMENT

Figure 1:
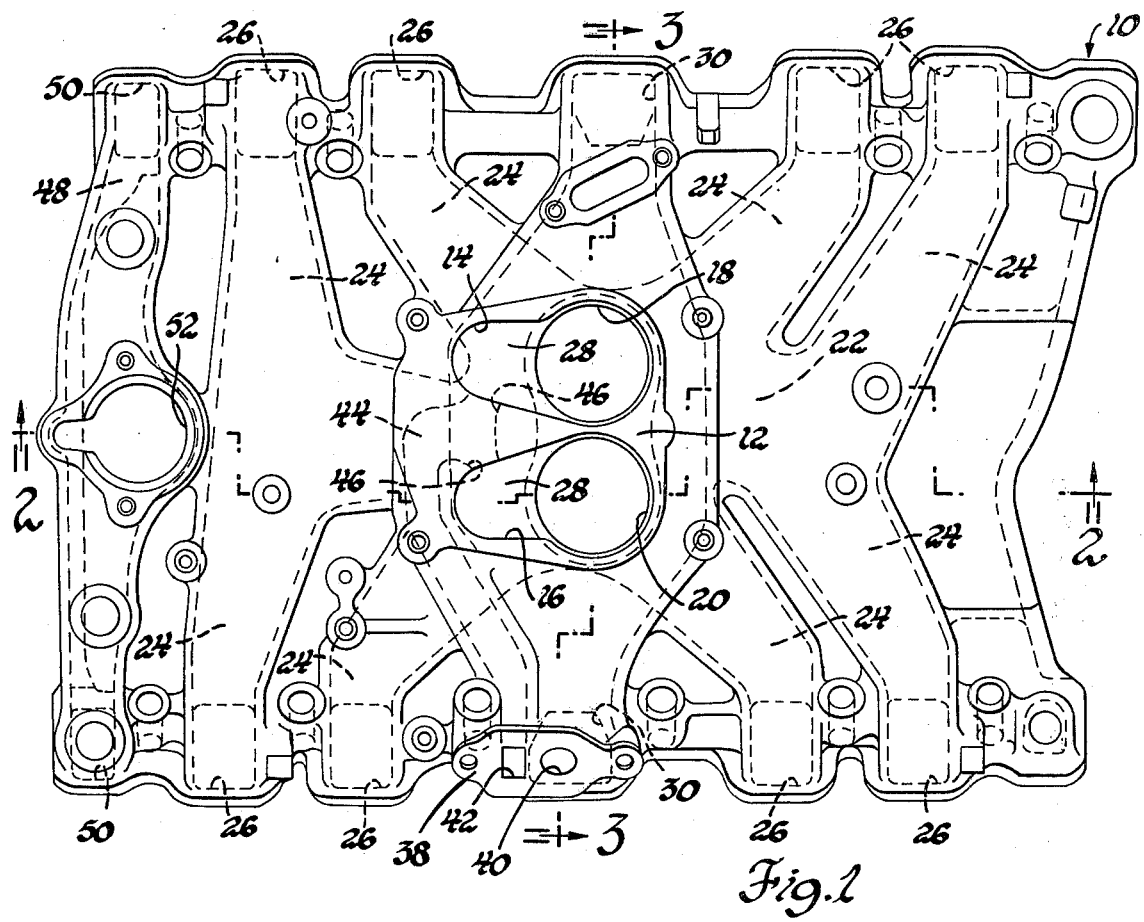
FIG. 1 is a top view of an intake manifold according to my invention.
Figure 2:
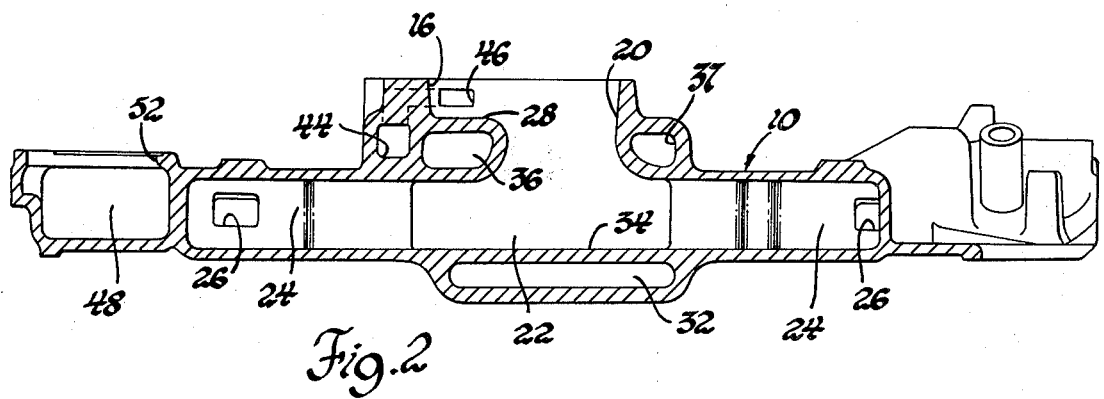
FIG. 2 is a section view along line 2—2 in FIG. 1.
Figure 3:
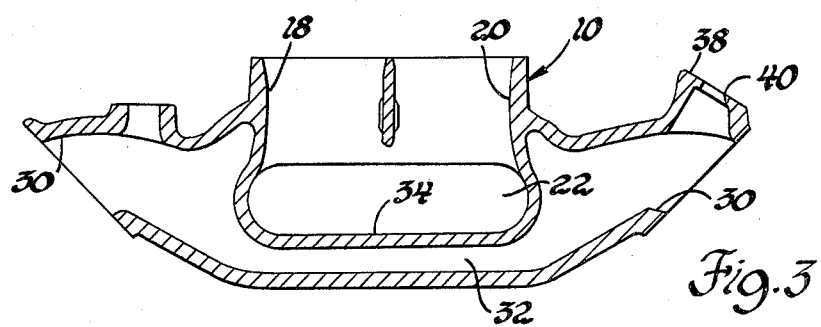
FIG. 3 is a section view along line 3—3 in FIG. 1.

FIG. 1 shows an intake manifold 10 for a V-8 engine as viewed from the top. A centrally located carburetor mounting pad 12 has openings for a pair of primary bores 14 and 16 and a pair of secondary bores 18 and 20 which line up with corresponding bores in a four-barrel carburetor and extend downward into the manifold 10. Secondary bores 18 and 20 are open at the bottom, as seen in FIGS. 2 and 3, to a generally horizontal central manifold chamber 22. From manifold chamber 22, as shown in FIG. 1, eight feed conduits 24 extend to openings 26 which line up with intake ports of the engine on which manifold 10 is mounted.

Primary bores 14 and 16 are open to secondary bores 18 and 20, respectively, but do not extend downward to manifold chamber 22. Rather, they are separated from manifold chamber 22 by primary floor 28 so that all fuel mixture must enter the manifold chamber 22 through secondary bores 18 and 20. It can be seen from FIG. 1 that secondary bores 18 and 20 are symmetrically placed on either side of an imaginary line extending from front to rear and bisecting the manifold 10. In addition, secondary bores 18 and 20 are approximately centrally located between the outlet ports 26 to the front and those to the rear. The feed conduits 24 are designed with length, size and shape such that the fuel mixture flow through each is as equal as possible to that through the others; and, since the fuel mixture enters manifold chamber 22 only through secondary bores 18 and 20, the even distribution is constant over time regardless of the flow distribution between the primary and secondary carburetor bores.

Manifold 10 has a pair of exhaust openings 30, one in the middle of each side. Between the exhaust openings 30, and open to each, are a number of exhaust crossover passages. A lower exhaust crossover passage 32 crosses underneath manifold chamber 22 to conduct hot exhaust gases underneath a heater floor 34, which is located directly under secondary bores 18 and 20. Liquid fuel carried by the mixture emerging from secondary bores 18 and 20 tends to impinge upon heater floor 34, where it is vaporized. This lower passage design is of standard industry practice.

A primary exhaust crossover passage 36 is provided under the primary floor 28 to heat primary floor 28 for vaporization of liquid fuel deposited on primary floor 28 by the mixture flowing down primary bores 14 and 16. This extra heating of the liquid fuel in the primary bores, made possible by the inclusion of primary floors 28, helps improve the mixture of fuel and air going to the engine. A third exhaust crossover passage 37 is located behind the secondary bores 18 and 20, and, in conjunction with the primary passage 36, heats the walls of the secondary bores to vaporize liquid fuel droplets that remain on the walls.

In the middle of one side of manifold 10 is an exhaust gas recirculation control valve mounting pad 38 having two openings therein. One opening 40 opens to the lower exhaust crossover passage 32; while the other opening 42 opens to an exhaust supply conduit 44 which opens through exhaust supply openings 46 into each of the primary bores 14 and 16.

The EGR control valve mounting pad 38 is adapted to support a normal EGR control valve to selectively allow flow of exhaust gases from the lower exhaust crossover passage 32 through opening 40, the valve, opening 42, exhaust supply conduit 44 and openings 46 into primary bores 14 and 16. The exhaust gases, when mixed with the fuel mixture, act as an inert gas in the mixture to lower the combustion temperature within the engine and thus reduce the formation of nitrogen oxides. It is, of course, the normal practice to introduce such exhaust gases into the primary bores or the manifold chamber. However, the inclusion of primary floors 28 causes the exhaust gases to traverse a longer path with the fuel mixture and undergo turbulence while passing through the secondary bores before entering manifold chamber 22. This helps mix the exhaust gas more completely with the fuel mixture before distribution to the engine cylinders.

Manifold 10 is finally provided with a standard coolant conduit 48 with an opening 50 on each side matching similar openings in the engine and a coolant inlet opening 52 for the attachment of conduit means from the water pump and radiator.

The particular embodiment described above is for purpose of example only. Many minor changes are possible to produce equivalent embodiments within the scope of this invention, and the invention should therefore be limited only by the claims which follow.

I claim:

1. For use with an internal combustion engine having parallel rows of cylinders, a multibore carburetor and an exhaust conduit: an intake manifold having a manifold chamber, a plurality of feed conduits for connecting the manifold chamber with the cylinders, one or more vertical secondary bores open at the bottom to the manifold chamber and open at the top for connection with the carburetor secondary bores, one or more primary bores open at the top for connection with the carburetor primary bores, each manifold primary bore being blocked from direct communication with the manifold chamber by a primary floor but being open to a manifold secondary bore, whereby intake fuel mixture from the carburetor is distributed consistently among the cylinders.

2. For use with an internal combustion engine having parallel rows of cylinders, a multibore carburetor and an exhaust conduit: an intake manifold having a manifold chamber, a plurality of feed conduits for connecting the manifold chamber with the cylinders, one or more secondary bores open at one end to the manifold chamber and at the other end for communication with the carburetor secondary bores, one or more primary bores open at one end for communication with the carburetor primary bores and at the other end to the manifold secondary bores, a manifold exhaust conduit connecting the engine exhaust conduit with each of the manifold primary bores, whereby exhaust gases and fuel mixture are mixed while flowing through parts of the manifold primary and secondary bores and are distributed consistently among the cylinders.

3. For use in an internal combustion engine having parallel rows of cylinders, a multibore carburetor and an exhaust conduit: an intake manifold having a manifold chamber, a plurality of feed conduits for connecting the manifold chamber with the cylinders, one or more secondary bores open at one end for communication with the carburetor secondary bores and at the other end to the manifold chamber, one or more primary bores oriented vertically in the manifold, the manifold primary bores being open at the top for communication with the carburetor primary bores, each manifold primary bore being blocked at the bottom from direct communication with the manifold chamber by a primary floor and open at the primary floor to a manifold secondary bore, each primary floor containing a floor exhaust conduit therethrough, the floor exhaust conduit being connectible to the engine exhaust conduit and adapted to circulate engine exhaust gases through each primary floor for the heating thereof, whereby liquid fuel droplets in a primary bore impinging on a primary floor can be vaporized and the fuel mixture consistently distributed among the cylinders.

4. An intake manifold for use with an internal combustion engine having two parallel rows of cylinders, a multibore carburetor and an exhaust conduit, the intake manifold including: a manifold chamber, a plurality of feed conduits for connecting the manifold chamber with the cylinders, a carburetor mounting pad above the manifold chamber, a pair of secondary bores extending vertically between the carburetor mounting pad and the manifold chamber to connect the latter to the carburetor secondary bores, a pair of primary bores extending vertically downward from the carburetor mounting pad for communication with the carburetor primary bores, each of the manifold primary bores being open to a manifold secondary bore, a primary floor at the lower end of each manifold primary bore to prevent direct communication thereof with the manifold chamber, a first exhaust conduit extending through each primary floor and communicating with the engine exhaust conduit, whereby exhaust gases are brought into contact with the primary floors for the heating thereof and resultant vaporization of liquid fuel deposited thereon, a second exhaust conduit communicating between the engine exhaust conduit and the manifold primary bores for introduction of exhaust gases into the manifold primary bores, whereupon the exhaust gases mix with fuel mixture in the manifold primary and secondary bores before entering the manifold chamber.

* * * * *